3,173,818
MANUFACTURE OF DEXTRINATED LEAD AZIDE
Kenneth John Holloway, Welling, Kent, George William Charles Taylor, Waltham Abbey, Essex, and Arwyn Theophilus Thomas, Orpington, Kent, England, assignors to Minister of Aviation, in Her Majesty's Government of the United Kingdom of Great Britain and Northern Ireland, London, England
No Drawing. Filed Jan. 16, 1963, Ser. No. 251,722
1 Claim. (Cl. 149—35)

The invention relates to an improved process for the manufacture of dextrinated lead azides which may be used as initiating and fast-burning explosives.

The use of dextrin as a co-precipitating colloid in the crystallisation of lead azide, to give products known as dextrinated lead azides, is well-established in manufacture. The dextrinated products are generally superior to the forms of lead azide obtained from processes which do not employ dextrin, since the employment of dextrin leads to the suppression of the undesirable beta modification of lead azide and the absorption of inert dextrin by the lead azide reduces the sensitivity of the product and consequently reduces the handling hazards.

The present invention provides an improved process for the manufacture of dextrinated lead azides in higher yield and with a lower proportion of fines in the mother liquor and a higher effective working capacity than has previously been possible, without deterioration of the physical form of the product. The product is obtained in the form of uniform rounded granules, giving a composition having a high bulk density and good free-flowing properties and which may be readily and safely handled. Moreover, in the present process a product having more reproducible azide values can be obtained, including high azide values above 93.5%. In particular, a product having an azide value between 94 and 96% can be consistently produced. The azide value is the percentage ratio of the azide radical content of the sample to the theoretical azide radical content of pure lead azide. The quality of the product is less dependent upon the quality of the dextrin used than in prior processes and consequently a wider range of dextrins may be employed than hitherto without reducing the quality of the product.

The improved method of manufacture of dextrinated lead azide according to the invention involves the precipitation of lead azide from solution in the presence of dextrin and a dispersing agent for finely divided solids suspended in a liquid medium containing water. Surface active agents are effective in a low concentration of about 0.02 to 0.2 percent by weight of the total liquid volume employed, and although higher percentages could be used there is generally no advantage. Such dispersing agents are of an ionic type and do not cause large reductions in surface tension at gas/liquid interfaces which lead to foaming, which is undesirable in explosive manufacture. Suitable dispersing agents are, anionic dispersing agents for example, organic sulphonic acids and their salts such as alkyl-aryl sulphonic acids and their salts and aryl sulphonates. A typical example of the alkyl-aryl sulphonic acid type which is available commercially is "Belloid TD," a disulphonic acid of dinaphthyl methane and more complex units based on tri- and tetra-naphthyl methanes. Examples of some other commercially available dispersing agents which may be used are "Anchoid" and "Dispersol T." "Belloid TD" (Geigy A.G.) "Dispersol T" (I.C.I. Ltd.), and "Anchoid" (Anchor Chemical Co.) are Trade Marks. The process is effective in conjunction with further additives such as solubilizers and nucleating agents, such as, for example, alkali derivatives of hydroxy-carboxylic and amino-carboxylic acids.

The improved process for the manufacture of dextrinated lead azide may be carried out in the following general manner:

The reactant solution or solutions are stored on the operating side of a protecting wall and added steadily to a prepared stirred base solution in the reaction vessel. At the end of the ensuing precipitation the stirrer is stopped, the product settles readily and the mother liquor is decanted. The product is washed by stirring with water and the wash liquors are removed by decantation. Finally the product may be transferred by means of a water spray into a filter box or drying pot and dried by the passage of cold dry air after washing with alcohol (methylated spirits), or by exposing on a hot plate. Final sieving is recommended as a check on drying.

The shape and dimensions of the precipitating vessel may be varied considerably provided that good agitation is maintained; adjustment of stirrer speed will usually compensate for minor differences between various stirrers and reaction vessels. Arrangements for washing, drying and sieving the product are not critical and may be modified to suit the equipment used.

A particular reaction vessel which is suitable for the manufacture of dextrinated lead azide by the new process consists of a tilting, 45-litre jacketed stainless steel pan, fitted with a smoothly-finished paddle-type stirrer. The stirrer should preferably be covered with rubber or plastic material and its speed should be adjustable around 80 revolutions/min. The pan jacket is provided with cold or hot water, or steam as required.

A particular example of the improved process of manufacture of lead azide is as follows:

27.73 litres of water and 0.25 litre Belloid TD solution (50 g. disulphonic acid of dinaphthyl methane per litre) are added to a 45-litre precipitation pan of the type described above and the temperature is adjusted to 50° C. with stirring at 78 revolutions/minute. 8.02 litres dextrine solution (45 g. dextrine per litre) are then added and the temperature is raised to 60° C. An advance of 0.1 litre sodium azide solution (containing 150 g. sodium azide, 1.5 g. sodium hydroxide and 0.3 g. sodium glucinate per litre) is added, followed by the simultaneous addition of 5.0 litres of this sodium azide solution and 5.0 litres of a lead nitrate solution (383 g. lead nitrate per litre) during a period of 40–45 minutes. Stirring at 60° C. is continued for a further five minutes and the reaction mixture is then cooled to 35° C. and the stirrer is stopped. The product is allowed to settle, the mother liquor is decanted and the product is washed three times by decantation with water. The product is filtered, washed with one litre of industrial methylated spirit and dried either by passage of cold air or on a hot table at 50° C. The dried granules are finally sieved through a 60 mesh B.S.S. stainless steel screen. The yield is 1.65 kg. of free-flowing product having a bulk-density of 2.2 g./ml. and an azide

We claim:

In the process for the manufacture of dextrinated lead azide which process comprises adding a soluble lead salt and a soluble azide salt separately to an aqueous solution containing dextrin the improvement which comprises adding a dispersing agent selected from the group consisting of alkyl-aryl sulfonic acids, aryl sulfonic acid and salts of aryl sulfonic acids to the reaction in a concentration between 0.02 and 0.2% by weight of said solution, whereby lead azide is precipitated in the presence of the dextrin and the dispersing agent and separating the precipitate of dextrinated lead azide from the aqueous solution.

References Cited by the Examiner

UNITED STATES PATENTS

| 2,421,778 | 6/47 | Fleischer et al. | 149—35 X |
| 2,464,777 | 3/49 | Rubeinstein et al. | 149—35 |
| 3,095,268 | 6/63 | Bostrom et al. | 23—101 |

FOREIGN PATENTS

| 569,833 | 2/59 | Canada. |

OTHER REFERENCES

Federoff: Encyclopedia of Explosives and Related Items, vol. I, Picatinny Arsenal, Dover, New Jersey, 1960, p. A547–A548.

CARL D. QUARFORTH, *Primary Examiner.*